United States Patent
Gao et al.

(10) Patent No.: US 10,929,230 B2
(45) Date of Patent: Feb. 23, 2021

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Jian Gao, Beijing (CN); Jibing Dong, Beijing (CN); Xinlei Xu, Beijing (CN); Geng Han, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 16/212,237

(22) Filed: Dec. 6, 2018

(65) Prior Publication Data
US 2019/0332479 A1    Oct. 31, 2019

(30) Foreign Application Priority Data
Apr. 28, 2018    (CN) .......................... 201810400532.2

(51) Int. Cl.
| | |
|---|---|
| *G06F 11/00* | (2006.01) |
| *G06F 11/10* | (2006.01) |
| *G06F 11/20* | (2006.01) |
| *G06F 11/14* | (2006.01) |
| *G06F 3/06* | (2006.01) |
| *G06F 12/02* | (2006.01) |

(52) U.S. Cl.
CPC ........ *G06F 11/1092* (2013.01); *G06F 3/0619* (2013.01); *G06F 3/0689* (2013.01); *G06F 11/1464* (2013.01); *G06F 11/2094* (2013.01); *G06F 3/065* (2013.01); *G06F 3/0649* (2013.01); *G06F 12/023* (2013.01); *G06F 2212/1032* (2013.01); *G06F 2212/262* (2013.01); *G06F 2212/7201* (2013.01)

(58) Field of Classification Search
CPC .................... G06F 11/1092; G06F 11/1088
See application file for complete search history.

(56) References Cited

U.S. PATENT DOCUMENTS

| | | | |
|---|---|---|---|
| 7,937,421 B2 | 5/2011 | Mikesell et al. | |
| 7,962,779 B2 | 6/2011 | Patel et al. | |
| 8,099,623 B1 * | 1/2012 | Li | G06F 11/1084 714/6.22 |

(Continued)

*Primary Examiner* — Michael Maskulinski
(74) *Attorney, Agent, or Firm* — BainwoodHuang

(57) ABSTRACT

Techniques manage a storage system. The storage system includes at least one part of multiple storage devices, here respective storage devices among the multiple storage devices include a first portion and a second portion, the first portion is for storing data and the second portion is reserved for rebuilding the storage system. The techniques involve: determining a storage device in the at least one part of storage devices fails; recovering data in a first portion of the failed storage device on the basis of data in a first portion of a normal storage device other than the failed storage device in the at least part of storage devices; selecting a group of storage devices from normal storage devices among the multiple storage devices; and writing recovered data to a second portion in the group of selected storage devices. Thereby, the speed of rebuilding the storage system may be increased, and further the overall performance of the storage system may be enhanced.

19 Claims, 9 Drawing Sheets

(56) References Cited

U.S. PATENT DOCUMENTS

| | | | |
|---|---|---|---|
| 8,112,395 B2 | 2/2012 | Patel et al. | |
| 8,127,307 B1 | 2/2012 | Palekar et al. | |
| 8,706,755 B2 | 4/2014 | Patel et al. | |
| 8,799,705 B2 | 8/2014 | Hallak et al. | |
| 8,990,495 B2 | 3/2015 | Hallak et al. | |
| 9,026,729 B1 | 5/2015 | Hallak et al. | |
| 9,063,910 B1 | 6/2015 | Hallak et al. | |
| 9,229,811 B2 | 1/2016 | Alexeev et al. | |
| 9,335,928 B2 * | 5/2016 | Shah | G06F 3/0608 |
| 9,367,395 B1 | 6/2016 | Bono et al. | |
| 9,514,014 B2 | 12/2016 | Webman et al. | |
| 9,552,258 B2 | 1/2017 | Hallak et al. | |
| 9,804,939 B1 | 10/2017 | Bono et al. | |
| 9,858,147 B2 * | 1/2018 | Minamiura | G06F 11/1088 |
| 9,891,994 B1 | 2/2018 | Schneider et al. | |
| 9,910,791 B1 | 3/2018 | Dibb et al. | |
| 9,971,648 B1 | 5/2018 | Schneider et al. | |
| 10,013,321 B1 | 7/2018 | Stern | |
| 10,210,045 B1 | 2/2019 | Gao et al. | |
| 2009/0228648 A1 * | 9/2009 | Wack | G06F 11/1092 711/114 |
| 2010/0251012 A1 * | 9/2010 | Zwisler | G06F 11/1092 714/6.32 |
| 2011/0197024 A1 * | 8/2011 | Thomas | G06F 3/0631 711/114 |
| 2015/0234709 A1 * | 8/2015 | Koarashi | G06F 11/1092 714/6.23 |
| 2015/0269025 A1 * | 9/2015 | Krishnamurthy | G06F 3/0689 714/6.24 |

* cited by examiner

METHOD, APPARATUS AND COMPUTER PROGRAM PRODUCT FOR MANAGING STORAGE SYSTEM

BACKGROUND

Various implementations of the present disclosure relate to storage management, and more specifically, to a method, apparatus and computer program product for managing a storage system (e.g. Redundant Array of Independent Disks (RAID)).

With the development of data storage techniques, various data storage devices now provide users with increasingly high data storage capacity, and their data access speed has been improved greatly. With the increase of data storage capacity, users also impose greater demands on data reliability and response time of storage systems. So far a variety of data storage systems based on redundant arrays of disks have been developed to improve reliability of data. When one or more disks in a storage system fail(s), a backup disk may be added to the storage system. Data in failed disk(s) can be rebuilt from other normal disk, and rebuilt data may be written to the backup disk.

It will be understood that during the above rebuilding, large amounts of inputs need to be written to the backup disk. Due to the restriction of the bandwidth of the backup disk, the rebuilding will last for a long time. Further, normal read and write access to the storage system will be affected during the rebuilding. Since the storage system is in a degraded state at this point, extra operations are needed for guaranteeing the reliability of data in the storage system. With the increase of the capacity of disks in the storage system, the extension of a rebuilding time will worsen the above problem. Therefore, it becomes a technical tough issue regarding how to rebuild the storage system more conveniently and effectively.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, provided is a method for managing a storage system. The storage system includes at least one part of multiple storage devices, here respective storage devices among the multiple storage devices include a first portion and a second portion, the first portion is for storing data and the second portion is reserved for rebuilding the storage system. The method includes: determining a storage device in the at least one part of storage devices fails; recovering data in a first portion of the failed storage device on the basis of data in a first portion of a normal storage device other than the failed storage device in the at least part of storage devices; selecting a group of storage devices from normal storage devices among the multiple storage devices; and writing recovered data to a second portion in the group of selected storage devices.

According to a second aspect of the present disclosure, provided is an apparatus for managing a storage system, the apparatus including: at least one processor; a volatile memory; and a memory coupled to the at least one processor, the memory having instructions stored thereon, the instructions, when executed by the at least one processor, causing the apparatus to perform acts for managing a storage system. The storage system includes at least one part of multiple storage devices, here respective storage devices among the multiple storage devices include a first portion and a second portion, the first portion is for storing data and the second portion is reserved for rebuilding the storage system. The acts include: determining a storage device in the at least one part of storage devices fails; recovering data in a first portion of the failed storage device on the basis of data in a first portion of a normal storage device other than the failed storage device in the at least part of storage devices; selecting a group of storage devices from normal storage devices among the multiple storage devices; and writing recovered data to a second portion in the group of selected storage devices According to a third aspect of the present disclosure, provided is a computer program product tangibly stored on a non-transient computer readable medium and including machine executable instructions for executing a method according to the first aspect of the present disclosure.

BRIEF DESCRIPTION OF THE SEVERAL VIEWS OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 1A:
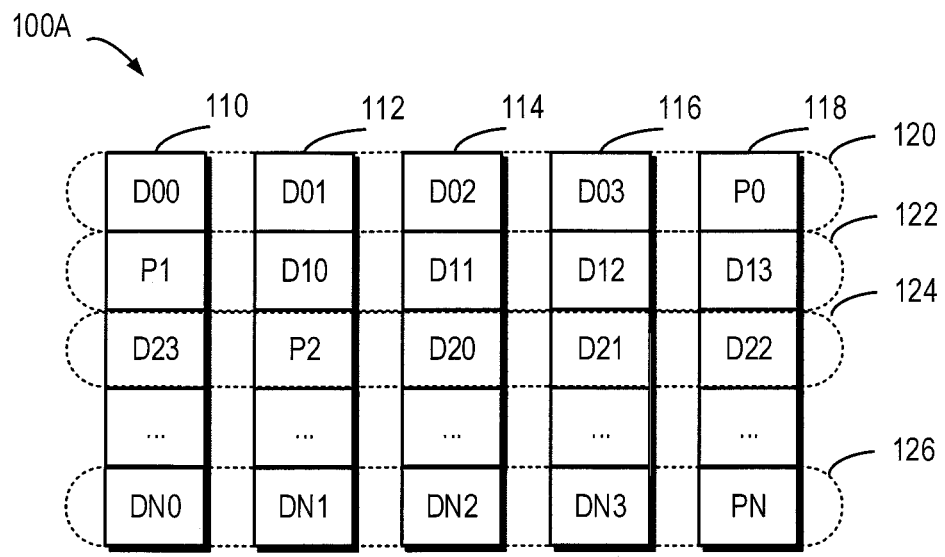
FIG. 1A illustrates a schematic view of a storage system in which a method of the present disclosure may be implemented.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be included according to different levels and/or configurations of RAID. Moreover, although FIG. 1A illustrates stripes 120, 122, 124, . . . , 126, in other examples the RAID system may further include a different number of stripes.

In RAID, a stripe crosses multiple physical storage devices (for example, the stripe 120 crosses the storage devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
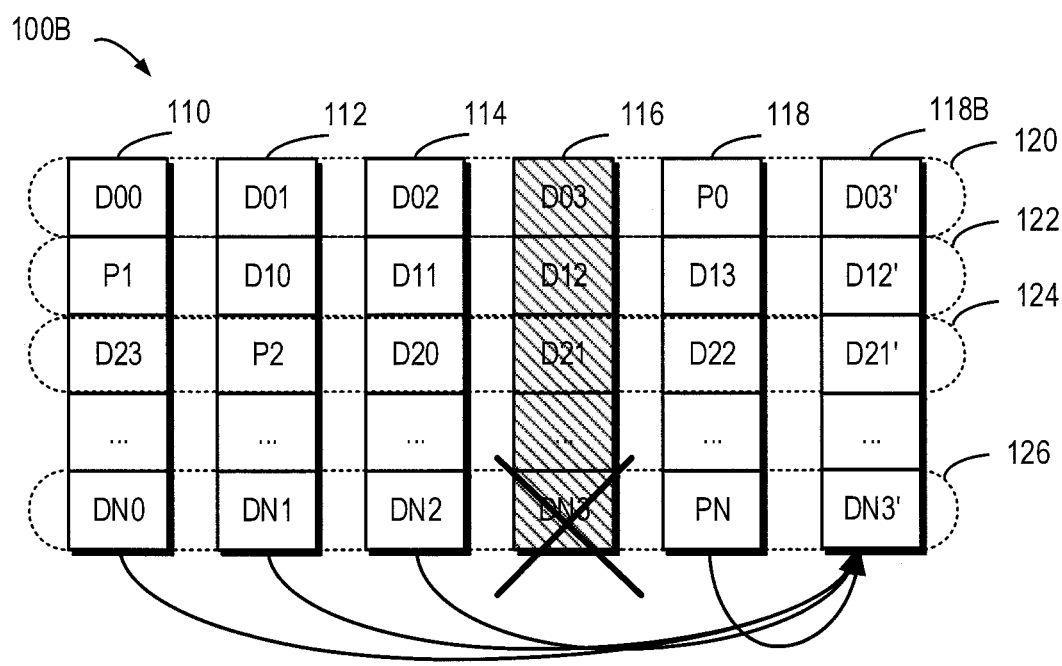
FIG. 1B illustrates a schematic view for rebuilding the storage system in FIG. 1A according to one technical solution.

FIG. 1B schematically illustrates a schematic view 100B of rebuilding process of the storage system 100A. As shown in FIG. 1B, when one storage device (e.g. the storage device 116 shown in shades) fails, data may be recovered from the other storage devices 110, 112, 114 and 118 that operate normally. At this point, a new backup storage device 118B may be added to RAID to replace the storage device 118. Further, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

When an architecture as shown in FIG. 1B is adopted, the backup storage device 118B needs to be provided separately. On the one hand, the backup storage device 118B requires extra overhead; on the other hand, during rebuilding of the storage system, each recovered data block (e.g. the data blocks D03, D12, D21, . . . , DN3 in the failed storage device 116) needs to be serially written to the backup storage device 118B. Therefore, the rebuilding is inefficient. In view of the foregoing problem, it is desirable to develop a technical solution that can provide a backup storage device at a lower cost and rebuild a storage system with higher efficiency.

According to example implementations of the present disclosure, there is provided a method for managing a storage system. The storage system includes at least one part of multiple storage devices, respective storage devices among the multiple storage devices include a first portion and a second portion. The first part is for storing data and the second part is reserved for rebuilding the storage system. In these implementations, each storage device may be divided into a first portion and a second portion, data may be stored in the first portion, and the second portion may be reserved as backup storage for possible rebuilding of the storage system later.

Figure 2:
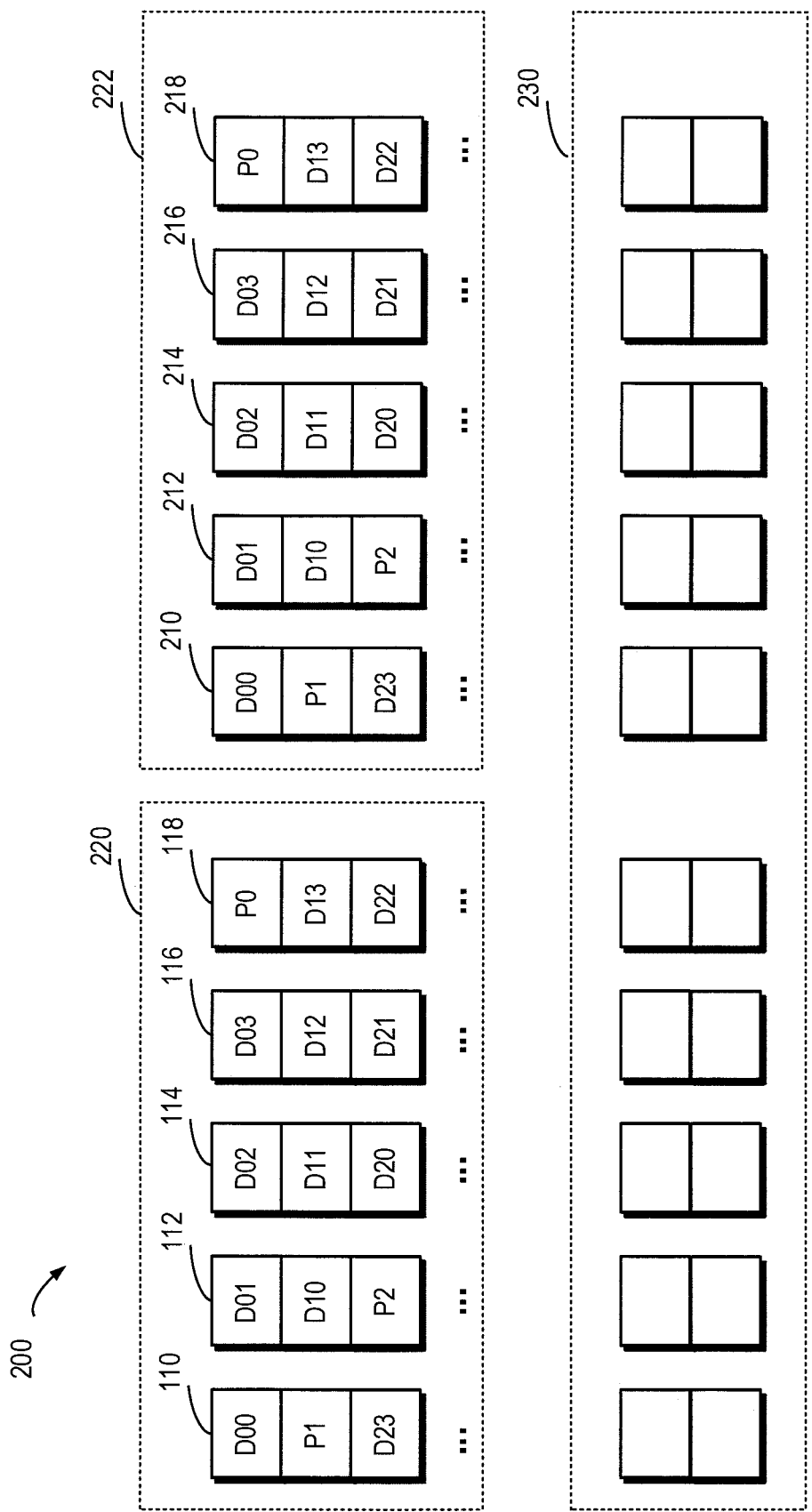
FIG. 2 illustrates an architecture view for managing a storage system according to example implementations of the present disclosure.

With reference to FIG. 2, description is presented below to more details. FIG. 2 schematically shows an architecture view 200 for managing a storage system according to example implementations of the present disclosure. In FIG. 2, illustrated are multiple storage devices 110, 112, 114, 116, 118, 210, 212, 214, 216 and 218, and these storage devices may be used for multiple storage systems. Each storage device may include a first portion and a second portion. For example, the first portion of each of the storage devices 110, 112, 114, 116 and 118 may be used for a storage system 220, while the first portion of each of the storage devices 210, 212, 214, 216 and 218 may be used for a further storage system 222.

In FIG. 2, a second portion 230 of each of the multiple storage devices is shown in a dashed box, and the second portion may be reserved as a backup storage device in case that a given storage device fails. Suppose the storage device 116 among the storage devices 110, 112, 114, 116 and 118 in the storage system 220 fails, then data in the first portion of the storage device 116 may be recovered on the basis of data in the first portion of the normal storage devices 110, 112, 114 and 118 in the storage system 220. Next, a group of storage devices (e.g. 210, 212, 214, 216 and 218) may be selected from normal storage devices among the multiple storage devices. Afterwards, recovered data may be written to the second portion of the group of selected storage devices.

It will be understood that a proportional relation between capacities of the first portion and the second portion may be determined in various ways. For example, the proportion may be set according to definition of a user of the storage system. For another example, the setting may further be based on proportions summarized from historical experience. According to example implementations of the present disclosure, the proportion of the first portion to the second portion may be set to 30:1 or other value. It should be guaranteed that the capacity of the second portion of the group of selected storage devices is enough to accommodate data in the failed storage device.

It will be understood although FIG. 2 illustrates storage devices in two storage systems (4D+1P), in other implementations there may exist more or less storage systems. According to example implementations of the present disclosure, there may exist only one storage system, at which point there are only 5 storage devices, i.e. 110, 112, 114, 116 and 118, and the second portions 230 include second portions of only 5 storage devices. According to example implementations of the present disclosure, there may further exist 3 storage systems (4D+1P), which is not detailed here.

Figure 3:
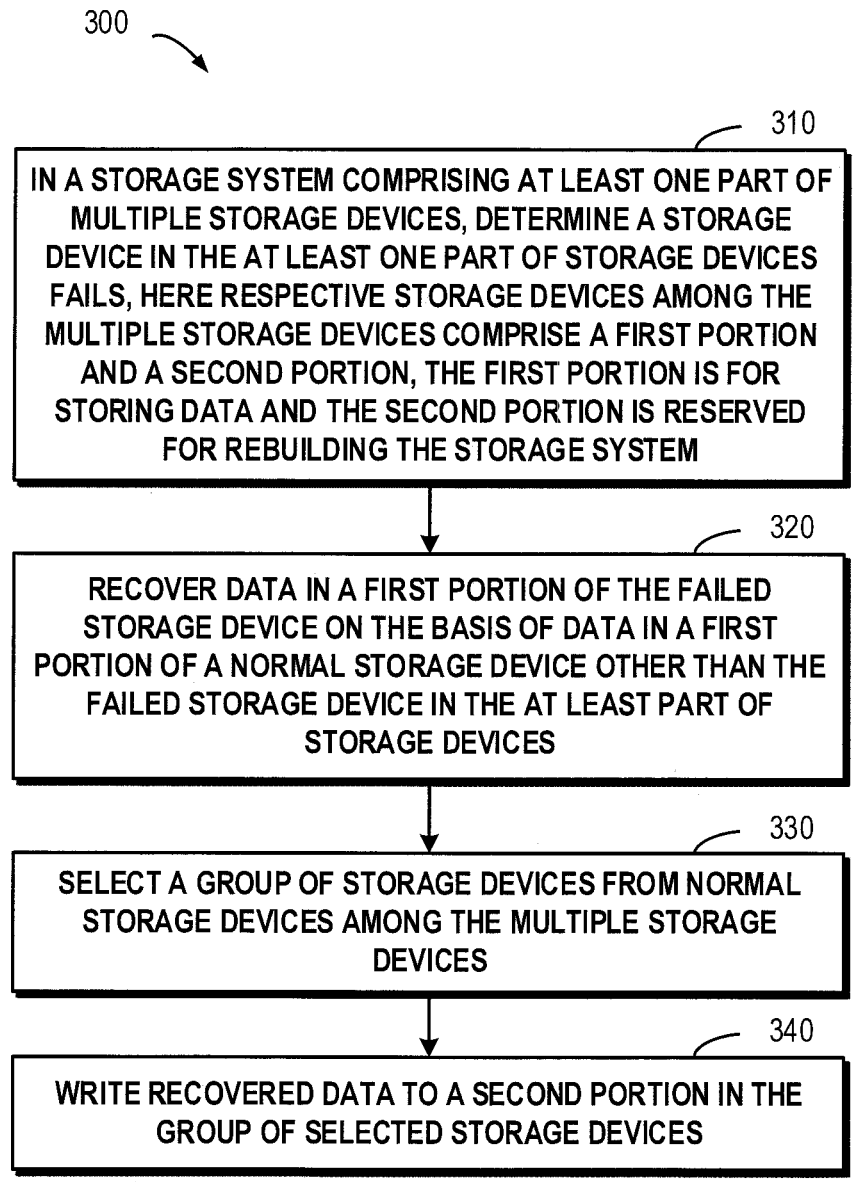
FIG. 3 illustrates a flowchart of a method for managing a storage system according to example implementations of the present disclosure.

FIG. 3 schematically shows a flowchart of a method 300 for managing a storage system according to example implementations of the present disclosure. At block 310, it is determined that a storage device in the at least one part of storage devices fails. At block 320, data in a first portion of the failed storage device is recovered on the basis of data in a first portion of a normal storage device other than the failed storage device in the at least one part of storage devices. In this implementation, the recovery operation may be executed depending on the type of the storage system. For example, regarding the storage system 220, when the storage device 116 fails, the data block D03 in the failed storage device 116 may be recovered on the basis of the data blocks DU0, D01, D02 and P0 in the normal storage devices 110, 112, 114 and 118 respectively.

At block 330, a group of storage devices may be selected from normal storage devices among the multiple storage devices. For example, the storage devices 210, 212, 214, 216 and 218 may be selected. At block 340, the recovered data block D03 may be written to a second portion in the group of selected storage devices. It will be understood although operations at blocks 320 and 330 are executed in order, it is not intended to limit an order of these operations throughout the context of the present disclosure. According to example implementations of the present disclosure, these operations may be executed in a reverse order or in parallel.

With the foregoing example implementation, on the one hand, a backup storage device does not need to be provided to the storage system separately, which may reduce the overhead of the storage system. On the other hand, recovered data may be written to the group of storage devices in parallel, which avoids a long recovery time caused by sequentially writing recovered data to a single backup storage device in traditional technical solutions.

According to example implementations of the present disclosure, the storage system may include an address mapping, and the address mapping may describe addresses in the multiple storage devices of data in the storage system. For example, an address range of the storage system which is visible to a user may be 0x00 . . . 00 to 0xff . . . fff, and the user needs to access data via a user address in the address range. The address mapping may describe a mapping relationship between a user address and a real physical address. Here the physical address may represent a real address of data in a storage device, for example, may be described as an identifier of a storage device and a real address of data in the storage device.

After writing the recovered data to the second portion in the group of storage devices, the address mapping of the storage system needs to be updated. Specifically, the address mapping of the storage system may be updated according to an address of the data in the first portion of the failed storage device and an address of the recovered data in the second portion of the group of storage devices. In the storage system 220, when the storage device 116 fails, the address mapping may be updated according to an address of the data block in the failed storage device 116 and an address of the recovered data block in the second portion of the group of storage devices. In this way, the inside of the storage system 220 is transparent to the user of the storage system 220, and the user does not have to know where data in the failed storage device 116 in the storage device 220 is recovered to. The storage system 220 may continue to operate based on the updated address mapping.

According to example implementations of the present disclosure, in response to receiving an access request to the storage system, target data associated with the access request are accessed on the basis of the updated address mapping. At this point, when the access request involves accessing a data block that used to reside in the failed storage device 116, the updated address mapping may guide the access request to a corresponding position in the second portion in the group of storage devices.

Figure 4:
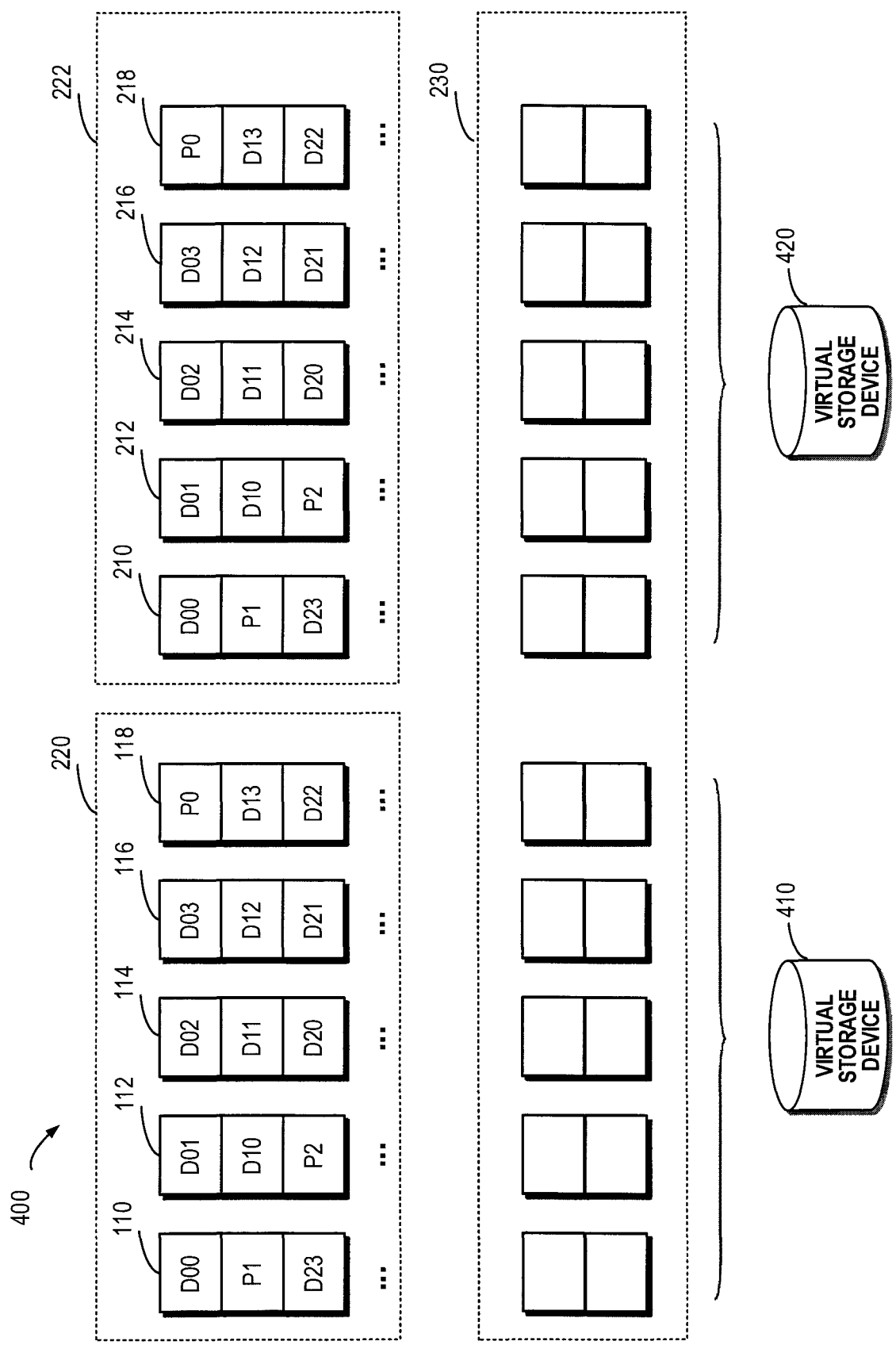
FIG. 4 illustrates a block diagram for building a virtual storage device on the basis of a second portion in multiple storage devices according to example implementations of the present disclosure.

According to example implementations of the present disclosure, for the sake of management, a virtual storage device may be created on the basis of the second portion in the group of storage devices. FIG. 4 schematically shows a block diagram 400 for creating virtual storage devices 410 and 420 on the basis of the second portion 230 of the multiple storage devices according to example implementations of the present disclosure. In this figure, the second portion 230 includes multiple extents from the storage devices 110, 112, 114, 116 and 118 as well as multiple extents from the storage devices 210, 212, 214, 216 and 218. According to example implementations of the present disclosure, the RAID-based virtual storage devices 410 and 420 may be created using the second portion in the group of storage device.

According to example implementations of the present disclosure, in order to increase the reliability of the rebuilt storage system, the group of storage devices may be selected from storage devices other than the at least one part of the multiple storage devices as far as possible. As shown in FIG. 4, when a storage device in the storage system 220 fails, one or more storage devices among the storage devices 210, 212, 214, 216 and 218 may be selected as backup storage devices. When a storage device in the storage system 222 fails, one or more storage devices among the storage devices 110, 112, 114, 116 and 118 may be selected as backup storage devices. With the above example implementations, backup storage devices and normal ones in the storage system are different physical storage devices, so the independent operation of various storage devices can be guaranteed and further the reliability of the rebuilt storage system can be ensured.

According to example implementations of the present disclosure, the group of storage devices may be selected on the basis of the number of storage devices in the storage system. At this point, the storage system 220 is a 4D+1P storage system, so second portions of 5 storage devices may be selected as backup storage.

After creating a virtual storage device, the recovered data may be written to the created virtual storage device. Specifically, suppose a storage device in the storage system 220 fails, a virtual storage device 420 may be created, and the recovered data may be written to the virtual storage device 420. Suppose a storage device in the storage system 222 fails, a virtual storage device 4120 may be created, and the recovered data may be written to the virtual storage device 410.

Figure 5:
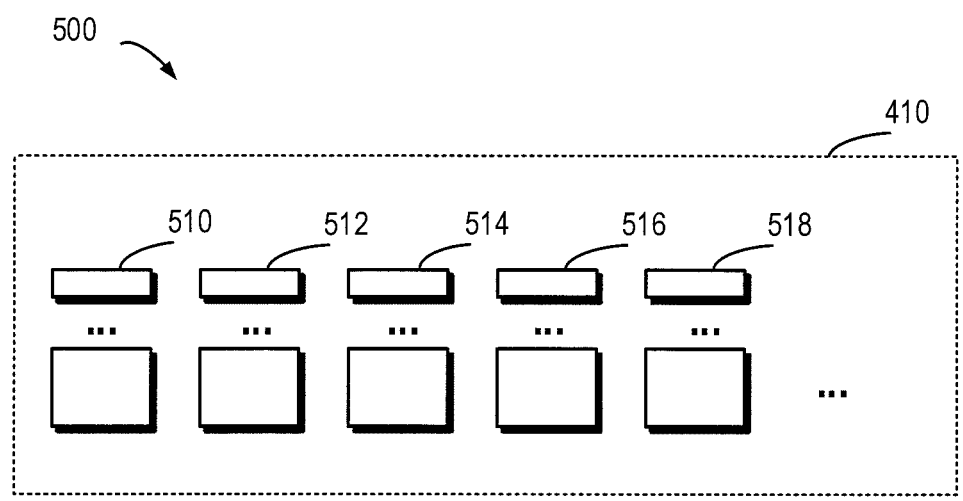
FIG. 5 illustrates a block diagram of a virtual storage device according to example implementations of the present disclosure.

FIG. 5 schematically shows a block diagram 500 of the virtual storage device according to example implementations of the present disclosure. As depicted, extents from multiple storage devices may be managed in a 4D+1P mode. For example, a stripe may be provided in the virtual storage device 410, and the stripe may cross over various storage devices in the virtual storage device 410. As shown in FIG. 5, the stripe may include extents 510, 512, 514, 516 and 518, among which four extents may be used for storing data and the rest may be used for storing parity of the data portion. The virtual storage device 410 may be created with reference to basic principles of RAID. Similarly, more stripes may be provided in the virtual storage device 410, which is not detailed in this specification.

It will be understood although FIG. 5 illustrates how to create the virtual storage device 410 in conformity with 4D+1P RAID rules on the basis of 5 storage devices, in other examples more or less storage devices may be selected and the virtual storage device 410 may be created on the basis of other rule. According to example implementations of the present disclosure, the storage device 410 may be created according to 4D+1P+1Q rules on the basis of second portions of 6 storage devices. Alternatively or additionally, the storage device 410 may be created on the basis of other rule.

According to example implementations of the present disclosure, the storage system may include multiple stripes. Regarding each stripe among the multiple stripes, data blocks associated with each stripe in the failed storage device may be recovered one by one. Operations to each stripe in the failed storage device are similar Hereinafter, description is presented by taking as example how to recover a first extent in a first stripe only. Data in the first extent may be recovered on the basis of data in a first portion of a normal storage device other than the failed storage device in the at least one part of storage devices. Subsequently, the recovered data may be written to a second portion in the group of selected storage devices, which includes: writing the recovered data in the first extent to the virtual storage device. More details about the recovery will be described below with reference to FIG. 6.

With the foregoing example implementations, since physical storage devices that create the virtual storage device differ from existing normal storage devices, when a further storage device among normal storage devices fails, data in the further failed storage device still may be recovered. Further, it is guaranteed that the storage device has higher reliability.

Figure 6:
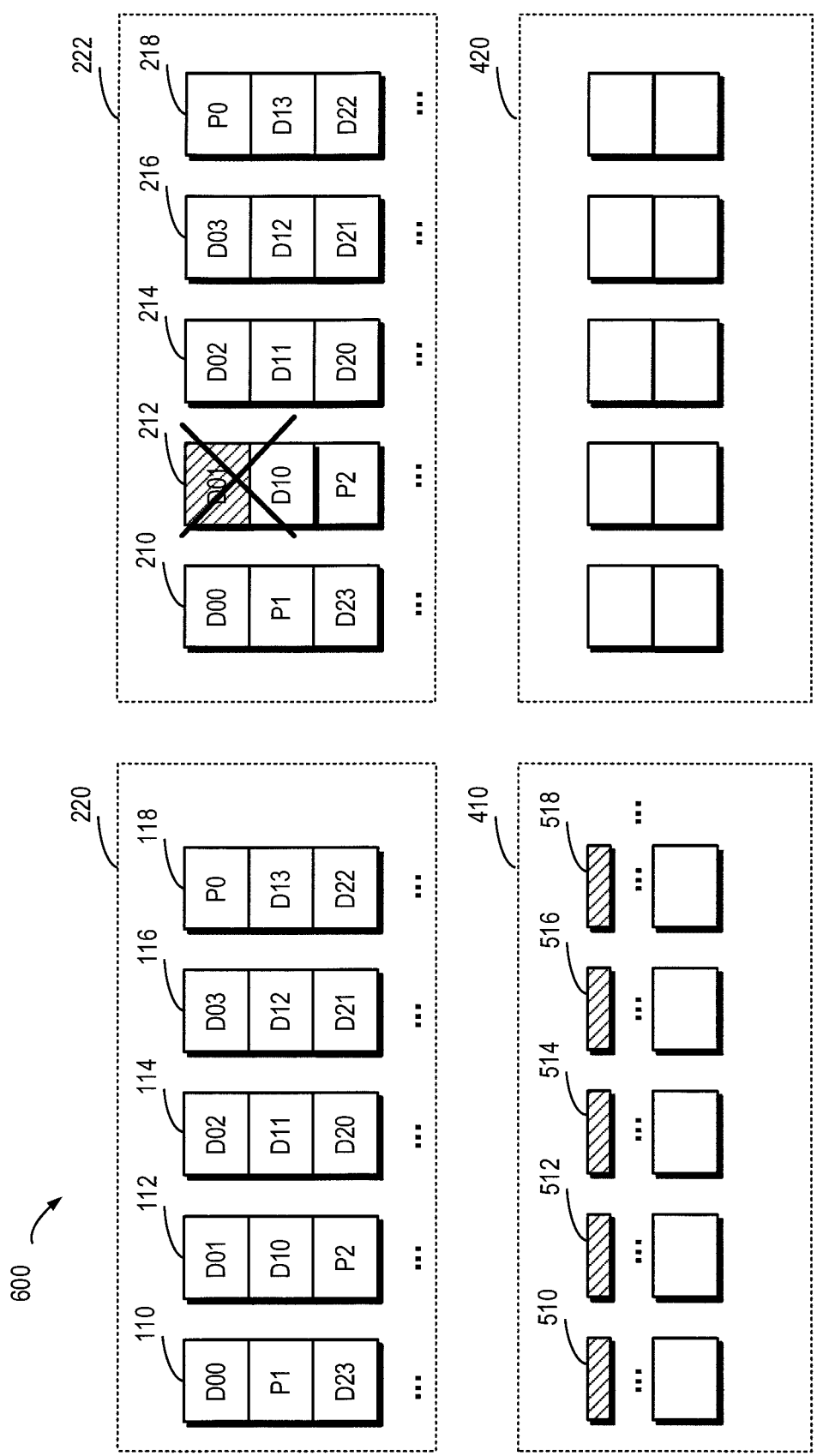
FIG. 6 illustrates a block diagram for rebuilding an extent in a storage system according to example implementations of the present disclosure.

FIG. 6 schematically shows a block diagram 600 for rebuilding an extent in the storage system 222 according to example implementations of the present disclosure. As depicted, suppose the storage device 212 in the storage system 222 fails, at this point data (e.g. the data blocks D01, D10, P2, etc.) in various extents in the failed storage device 212 may be recovered one by one. Regarding a first extent in a first stripe, the data block D01 may be recovered on the basis of the respective data blocks D00, D02, D03 and P0 in the storage devices 210, 214, 216 and 218 so as to form a recovered data block. Subsequently, the recovered data block may be written to various extents (e.g. the extents 510, 512, 514, 516 and 518 shown in shades) in a first stripe in the virtual storage device 410.

Based on the operation to the data block D01, other data blocks D10, P2 and so on in the failed storage device 212 may be processed likewise. For example, the recovered data block D10 may be written to a second stripe in the virtual storage device 410, the recovered data block P2 may be written to a third stripe, and so on and so forth.

According to example implementations of the present disclosure, when the storage system includes multiple stripes, recovered data associated with each stripe may be written to the virtual storage device in parallel. With the foregoing example implementations, the storage system may be rebuilt at least partially in parallel, and further the rebuilding efficiency may be improved. For example, if the storage device includes a second stripe crossing over the at least one part of storage devices, data in the second extent may be recovered on the basis of data in a first portion of a normal storage device other than the failed storage device in the at least one part of storage devices. Subsequently, the recovered data in the second extent may be written to the virtual storage device in parallel with writing the recovered data in the first extent to the virtual storage device.

Figure 7:
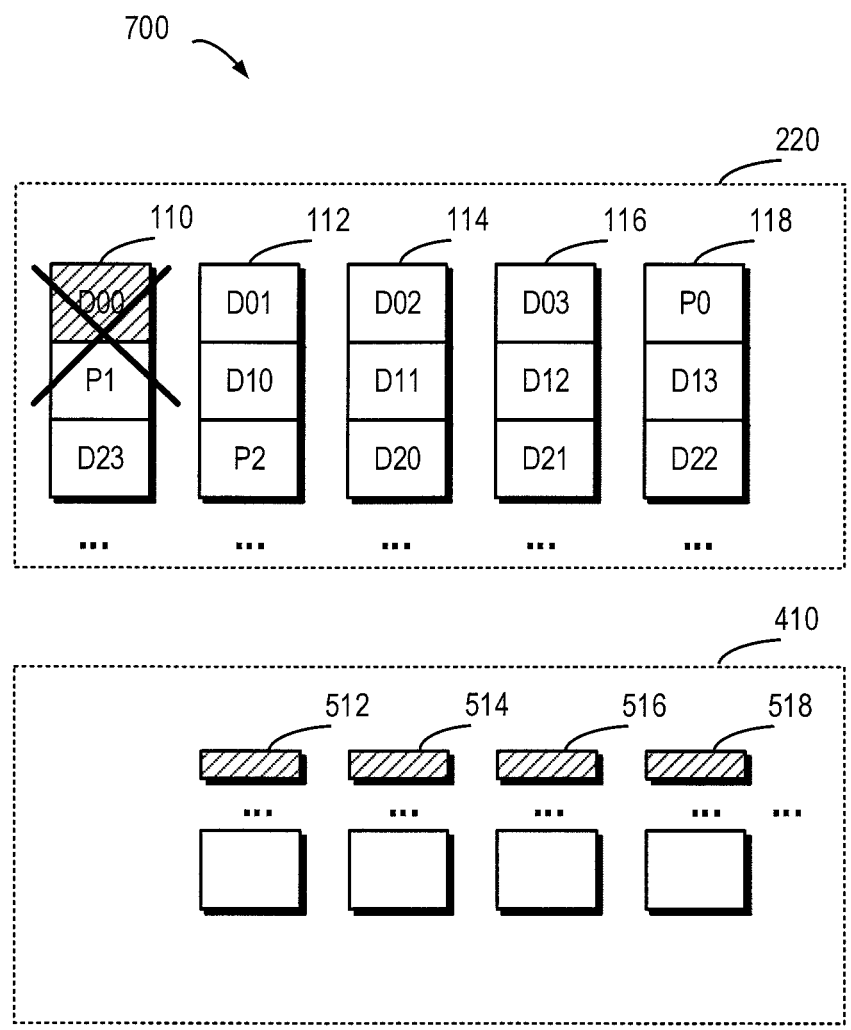
FIG. 7 illustrates a block diagram for rebuilding an extent in a storage system according to example implementations of the present disclosure.

Description has been presented to the technical solution in which a virtual storage device is built by selecting a group of storage devices, different from storage devices in the storage system, from multiple storage devices and recovered data are written to the virtual storage device. According to example implementations of the present disclosure, a situation that there exists only one storage system might further be involved. With reference to FIG. 7, description is presented below to more details.

FIG. 7 schematically shows a block diagram 700 for rebuilding an extent in a storage system according to example implementations of the present disclosure. FIG. 7 illustrates only one storage system 220. When the storage device 110 in the storage system 220 fails, the virtual storage device 410 may be built on the basis of second portions in the normal storage devices 112, 114, 116 and 118. At this point, data in various extents in the failed storage device 110 may be written to various stripes in the virtual storage device 410. For example, the data block D00 in a first extent may be stored in the extents 512, 514, 516 and 518 in a first stripe.

It will be understood when a failed storage device appears in the storage system, the failed storage device needs to be replaced using a normal storage device so as to ensure the normal use of the storage system. According to example implementations of the present disclosure, if it is detected a backup storage device for replacing the failed storage device is added to the storage system to replace, then data may be copied to the backup storage device from the second portion in the group of storage devices. Subsequently, the address mapping is updated according to an address of the copied data in the backup storage device. In this implementation, since the speed of the copy operation is far faster than that of the operation to recover data from a normal storage device, the failed storage device will be replaced quickly.

According to example implementations of the present disclosure, after completing copying data to the backup storage device, the storage system will be recovered to a normal storage device, so the storage space in the second portion in the group of storage devices may be released. At this point, the storage space in the second portion may be used when a storage device in the storage system fails.

Figure 8:
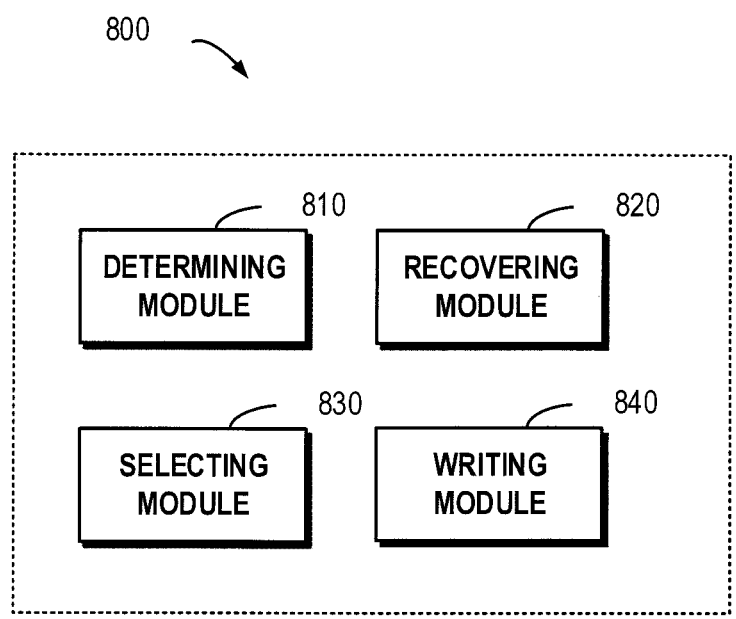
FIG. 8 illustrates a block diagram of an apparatus for managing a storage system according to example implementations of the present disclosure.

While examples of the method according to the present disclosure have been described in detail with reference to FIGS. 2 to 7, a detailed description is now presented to implementations of a corresponding apparatus with reference to FIG. 8. This figure schematically shows a block diagram of an apparatus 800 for managing a storage system according to example implementations of the present disclosure. The storage system includes at least one part of multiple storage devices, and respective storage devices among the multiple storage devices include a first portion and a second portion. The first portion is for storing data and the second portion is reserved for rebuilding the storage system. Specifically, the apparatus 800 includes: a determining module 810 configured to determine a storage device in the at least one part of storage devices fails; a recovering module 820 configured to recover data in a first portion of the failed storage device on the basis of data in a first portion of a normal storage device other than the failed storage device in the at least part of storage devices; a selecting module 830 configured to select a group of storage devices from normal storage devices among the multiple storage devices; and a writing module 840 configured to write recovered data to a second portion in the group of selected storage devices.

Figure 9:
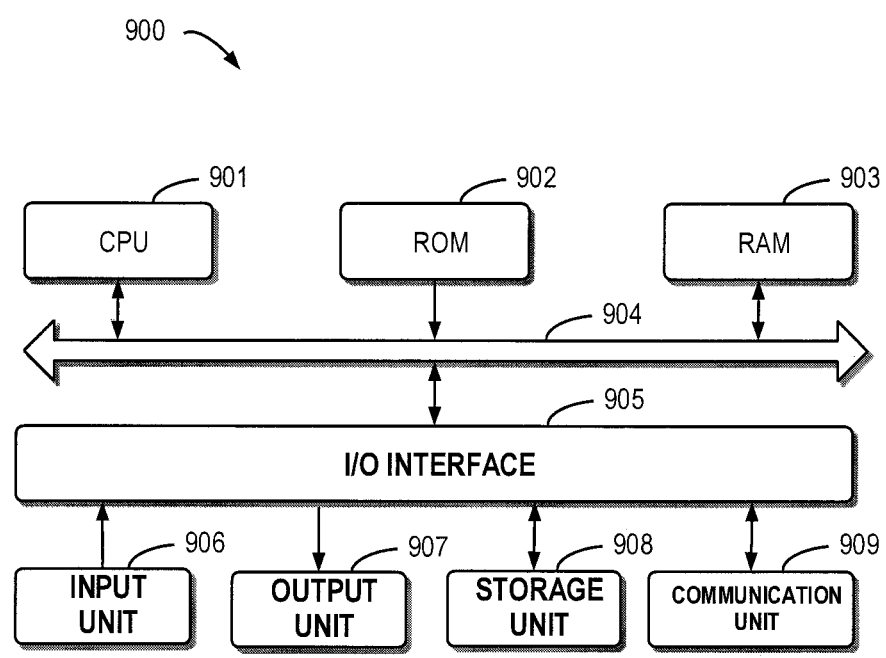
FIG. 9 illustrates a block diagram of an apparatus for managing a storage system according to example implementations of the present disclosure.

FIG. 9 schematically shows a block diagram of an apparatus 900 for managing a storage system according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904. In accordance with certain embodiments, other types of computerized equipment/circuitry are used in place of and/or in combination with the computerized circuitry described above.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the method 300, can also be executed by the processing unit 901. For example, in some implementations, the method 300 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described method 500 can be implemented. Alternatively, in other implementations, the CPU 901 also can be configured in other suitable manners to realize the above procedure/method.

According to example implementations of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts for managing a storage system. The storage system includes at least one part of multiple storage devices, and respective storage devices among the multiple storage devices include a first portion and a second portion. Here the first portion is for storing data and the second portion is reserved for rebuilding the storage system. The acts include: determining a storage device in the at least one part of storage devices fails; recovering data in a first portion of the failed storage device on the basis of data in a first portion of a normal storage device other than the failed storage device in the at least part of storage devices; selecting a group of storage devices from normal storage devices among the multiple storage devices; and writing recovered data to a second portion in the group of selected storage devices.

According to example implementations of the present disclosure, the acts further include: updating an address mapping of the storage system according to an address of the data in the first portion of the failed storage device and an address of the recovered data in the second portion in the group of storage devices, the address mapping describing addresses in the multiple storage devices of data in the storage system.

According to example implementations of the present disclosure, the acts further include: in response to receiving an access request to the storage system, accessing target data associated with the access request on the basis of the updated address mapping.

According to example implementations of the present disclosure, writing recovered data to a second portion in the group of selected storage devices includes: creating a RAID-based virtual storage device by using the second portion in the group of storage devices; and writing the recovered data to the virtual storage device.

According to example implementations of the present disclosure, the storage device includes a first stripe crossing over the at least one part of storage devices, wherein recovering data in the failed storage device includes: with respect to a first extent in the first stripe in the failed storage device, recovering data in the first extent on the basis of data in a first portion of a normal storage device other than the failed storage device in the at least one part of storage devices; and writing the recovered data to a second portion in the group of selected storage devices includes: writing to the virtual storage device the recovered data in the first extent.

According to example implementations of the present disclosure, the storage device includes a second stripe crossing over the at least one part of storage devices, wherein recovering data in the failed storage device includes: with respect to a second extent in the second stripe in the failed storage device, recovering data in the second extent on the basis of data in a first portion of a normal storage device other than the failed storage device in the at least one part of storage devices; and writing recovered data to a second portion in the group of selected storage devices includes: writing to the virtual storage device the recovered data in the second extent in parallel with writing to the virtual storage device the recovered data in the first extent.

According to example implementations of the present disclosure, selecting the group of storage devices includes: selecting the group of storage devices from storage devices other than the at least one part of storage devices among the multiple storage devices.

According to example implementations of the present disclosure, selecting the group of storage devices includes: selecting the group of storage devices on the basis of the number of storage devices in the storage system.

According to example implementations of the present disclosure, the acts further include: in response to detecting a backup storage device for replacing the failed storage device is added to the storage system, copying data to the backup storage device from the second portion in the group of storage devices; and updating the address mapping according to an address of the data in the backup storage device.

According to example implementations of the present disclosure, the acts further include: releasing a storage space of the second portion in the group of storage devices.

According to example implementations of the present disclosure, there is provided a computer program product. The computer program product is tangibly stored on a computer readable medium and includes machine executable instructions which, when executed, cause a machine to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

The invention claimed is:

1. A method for managing a storage system, the storage system including multiple storage devices, respective storage devices among the multiple storage devices including a first portion and a second portion, the first portion being for storing data and the second portion being reserved for rebuilding at least a portion of the storage system, the method comprising:
   determining that a storage device of the multiple storage devices fails;
   recovering data in a first portion of the failed storage device on the basis of data in a first portion of a normal storage device other than the failed storage device;
   selecting a group of storage devices from normal storage devices among the multiple storage devices; and
   writing the recovered data to a second portion in the group of selected storage devices;
   wherein selecting the group of storage devices includes:
      selecting the group of storage devices from storage devices other than the multiple storage devices.

2. The method according to claim 1, further comprising:
   updating an address mapping of the storage system according to an address of the data in the first portion of the failed storage device and an address of the recovered data in the second portion in the group of storage devices, the address mapping describing addresses in the multiple storage devices of data in the storage system.

3. The method according to claim 2, further comprising:
   in response to receiving an access request to the storage system, accessing target data associated with the access request on the basis of the updated address mapping.

4. The method according to claim 2, further comprising:
   in response to detecting a backup storage device for replacing the failed storage device is added to the storage system, copying data to the backup storage device from the second portion in the group of storage devices and updating the address mapping according to an address of the data in the backup storage device.

5. The method according to claim 4, further comprising:
   releasing a storage space of the second portion in the group of storage devices.

6. The method according to claim 1, wherein writing the recovered data to the second portion in the group of selected storage devices includes:
   creating a RAID-based virtual storage device by using the second portion in the group of storage devices; and
   writing the recovered data to the virtual storage device.

7. The method according to claim 1, wherein the multiple storage devices include a first stripe,
   wherein recovering data in the failed storage device includes:
      with respect to a first extent in the first stripe in the failed storage device, recovering data in the first extent on the basis of data in a first portion of a normal storage device other than the failed storage device; and
   wherein writing the recovered data to the second portion in the group of selected storage devices includes:
      writing, to a virtual storage device, the recovered data in the first extent.

8. The method according to claim 1, wherein selecting the group of storage devices further includes:
   selecting the group of storage devices on the basis of the number of storage devices in the storage system.

9. A method for managing a storage system, the storage system including multiple storage devices, respective storage devices among the multiple storage devices including a first portion and a second portion, the first portion being for storing data and the second portion being reserved for rebuilding at least a portion of the storage system, the method comprising:
   determining that a storage device of the multiple storage devices fails;
   recovering data in a first portion of the failed storage device on the basis of data in a first portion of a normal storage device other than the failed storage device;
   selecting a group of storage devices from normal storage devices among the multiple storage devices; and
   writing the recovered data to a second portion in the group of selected storage devices;
   wherein the multiple storage devices include a first stripe,
   wherein recovering data in the failed storage device includes:
      with respect to a first extent in the first stripe in the failed storage device, recovering data in the first extent on the basis of data in a first portion of a normal storage device other than the failed storage device;
   wherein writing the recovered data to the second portion in the group of selected storage devices includes:
      writing, to a virtual storage device, the recovered data in the first extent;
   wherein the multiple storage devices include a second stripe;
   wherein recovering data in the failed storage device includes:

with respect to a second extent in the second stripe in the failed storage device, recovering data in the second extent on the basis of data in a first portion of a normal storage device other than the failed storage device in the at least one part of storage devices; and wherein writing the recovered data to the second portion in the group of selected storage devices includes:
  writing, to the virtual storage device, the recovered data in the second extent in parallel with writing, to the virtual storage device, the recovered data in the first extent.

10. An apparatus for managing a storage system, comprising:
  at least one processor;
  a volatile memory; and
  a memory coupled to the at least one processor, the memory having instructions stored thereon, the instructions, when executed by the at least one processor, causing the apparatus to perform acts for managing a storage system, the storage system including multiple storage devices, respective storage devices among the multiple storage devices including a first portion and a second portion, the first portion being for storing data and the second portion being reserved for rebuilding the storage system, the acts including:
    determining that a storage device of the multiple storage devices fails;
    recovering data in a first portion of the failed storage device on the basis of data in a first portion of a normal storage device other than the failed storage device;
    selecting a group of storage devices from normal storage devices among the multiple storage devices; and
    writing the recovered data to a second portion in the group of selected storage devices;
  wherein selecting the group of storage devices includes:
    selecting the group of storage devices from storage devices other than the multiple storage devices.

11. The apparatus according to claim 10, wherein the acts further include:
  updating an address mapping of the storage system according to an address of the data in the first portion of the failed storage device and an address of the recovered data in the second portion in the group of storage devices, the address mapping describing addresses in the multiple storage devices of data in the storage system.

12. The apparatus according to claim 11, wherein the acts further comprise: in response to receiving an access request to the storage system,
  accessing target data associated with the access request on the basis of the updated address mapping.

13. The apparatus according to claim 11, wherein the acts further include:
  in response to detecting a backup storage device for replacing the failed storage device is added to the storage system, copying data to the backup storage device from the second portion in the group of storage devices, and updating the address mapping according to an address of the data in the backup storage device.

14. The apparatus according to claim 13, wherein the acts further include:
  releasing a storage space of the second portion in the group of storage devices.

15. The apparatus according to claim 10, wherein writing recovered data to a second portion in the group of selected storage devices comprises:
  creating a RAID-based virtual storage device by using the second portion in the group of storage devices; and
  writing the recovered data to the virtual storage device.

16. The apparatus according to claim 10, wherein the multiple storage devices include a first stripe;
  wherein recovering data in the failed storage device comprises:
    with respect to a first extent in the first stripe in the failed storage device, recovering data in the first extent on the basis of data in a first portion of a normal storage device other than the failed storage device; and
  wherein writing the recovered data to the second portion in the group of selected storage devices includes:
    writing, to a virtual storage device, the recovered data in the first extent.

17. The apparatus according to claim 10, wherein selecting the group of storage devices further includes:
  selecting the group of storage devices on the basis of the number of storage devices in the storage system.

18. An apparatus for managing a storage system, comprising:
  at least one processor;
  a volatile memory; and
  a memory coupled to the at least one processor, the memory having instructions stored thereon, the instructions, when executed by the at least one processor, causing the apparatus to perform acts for managing a storage system, the storage system including multiple storage devices, respective storage devices among the multiple storage devices including a first portion and a second portion, the first portion being for storing data and the second portion being reserved for rebuilding the storage system, the acts including:
    determining that a storage device of the multiple storage devices fails;
    recovering data in a first portion of the failed storage device on the basis of data in a first portion of a normal storage device other than the failed storage device;
    selecting a group of storage devices from normal storage devices among the multiple storage devices; and
    writing the recovered data to a second portion in the group of selected storage devices;
  wherein the multiple storage devices include a first stripe;
  wherein recovering data in the failed storage device comprises:
    with respect to a first extent in the first stripe in the failed storage device, recovering data in the first extent on the basis of data in a first portion of a normal storage device other than the failed storage device;
  wherein writing the recovered data to the second portion in the group of selected storage devices includes:
    writing, to a virtual storage device, the recovered data in the first extent;
  wherein the storage device comprises a second stripe crossing over the at least one part of storage devices;
  wherein recovering data in the failed storage device includes:
    with respect to a second extent in the second stripe in the failed storage device, recovering data in the second extent on the basis of data in a first portion of a normal storage device other than the failed storage device in the at least one part of storage devices; and wherein writing the recovered data to a second portion in the group of selected storage devices includes:
writing, to the virtual storage device, the recovered data in the second extent in parallel with writing, to the virtual storage device, the recovered data in the first extent.

19. A computer program product having a non-transitory computer readable medium which stores a set of instructions to manage a storage system; the set of instructions, when carried out by computerized circuitry of the storage system, causing the computerized circuitry to perform a method of:
determining that a storage device among multiple storage devices of the storage system fails, each storage device of the multiple storage devices having a first portion constructed and arranged to store data and a second portion reserved for rebuilding data;
recovering data, which was stored in a first portion of the failed storage device, based on data in a first portion of at least one storage device other than the failed storage device;
selecting a group of storage devices that are different from the multiple storage devices, each storage device of the group of storage devices having a first portion constructed and arranged to store data and a second portion reserved for rebuilding data; and
writing the recovered data to a second portion in the group of selected storage devices.

\* \* \* \* \*